United States Patent
Jo (10) Patent No.: US 11,214,516 B2
(45) Date of Patent: Jan. 4, 2022

(54) CEMENT ADDITIVE AND METHOD FOR PRODUCING SAME

(71) Applicants: Byeong Hak Jo, Jecheon-si (KR); Won Ho Jo, Jecheon-si (KR)

(72) Inventor: Byeong Hak Jo, Jecheon-si (KR)

(*) Notice: Subject to any disclaimer, the term of this patent is extended or adjusted under 35 U.S.C. 154(b) by 0 days.

(21) Appl. No.: 16/762,635

(22) PCT Filed: Feb. 12, 2018

(86) PCT No.: PCT/KR2018/001804
§ 371 (c)(1),
(2) Date: May 8, 2020

(87) PCT Pub. No.: WO2019/093587
PCT Pub. Date: May 16, 2019

(65) Prior Publication Data
US 2020/0283338 A1     Sep. 10, 2020

(30) Foreign Application Priority Data

Nov. 10, 2017  (KR) .................. 10-2017-0149060

(51) Int. Cl.
| | | |
|---|---|---|
| C04B 22/14 | (2006.01) |
| C04B 14/02 | (2006.01) |
| C04B 14/08 | (2006.01) |
| C04B 18/10 | (2006.01) |
| C04B 22/12 | (2006.01) |
| C04B 24/04 | (2006.01) |
| C04B 111/00 | (2006.01) |

(52) U.S. Cl.
CPC .......... C04B 22/149 (2013.01); C04B 14/022 (2013.01); C04B 14/08 (2013.01); C04B 18/101 (2013.01); C04B 22/12 (2013.01); C04B 24/04 (2013.01); *C04B 2111/00025* (2013.01); *C04B 2201/50* (2013.01)

(58) Field of Classification Search
CPC ....... C04B 14/06; C04B 14/08; C04B 14/022; C04B 18/101; C04B 18/24; C04B 22/12; C04B 22/14; C04B 22/149; C04B 24/04; C04B 28/02; C04B 40/0039; C04B 2111/00025; C04B 2111/1081; C04B 2201/50; Y02W 30/91
See application file for complete search history.

(56) References Cited

U.S. PATENT DOCUMENTS

| | | |
|---|---|---|
| 5,736,600 A | 4/1998 | Karkare et al. |
| 8,663,384 B2 | 3/2014 | Takayuki et al. |
| 2010/0170420 A1 | 7/2010 | Magistri et al. |
| 2017/0174572 A1 | 6/2017 | Buchwald et al. |

FOREIGN PATENT DOCUMENTS

| | | | |
|---|---|---|---|
| CN | 107199042 A | | 9/2017 |
| CN | 107352840 A | * | 11/2017 |
| EP | 1533287 | | 5/2005 |
| JP | S48-083114 A | | 11/1973 |
| JP | 2000086322 A | | 3/2000 |
| JP | 2000515909 A | | 11/2000 |
| JP | 2002003253 A | | 1/2002 |
| JP | 2008-273993 | | 11/2008 |
| JP | 2008273993 A | | 11/2008 |
| JP | 2008-308396 | | 12/2008 |
| JP | 2008308396 A | | 12/2008 |
| JP | 2009173466 A | | 8/2009 |
| JP | 2010195602 A | | 9/2010 |
| JP | 5876836 | | 3/2016 |
| KR | 10-0815289 | | 3/2008 |
| KR | 10-2008-0044246 | | 6/2008 |
| KR | 10-0851929 | | 8/2008 |
| KR | 10-1237508 | | 2/2013 |
| KR | 101237508 B1 | | 2/2013 |
| KR | 10-1433135 | | 8/2014 |
| WO | 2007021617 A2 | | 2/2007 |

OTHER PUBLICATIONS

English language translation of Written Opinion for PCT/KR2018/001804 (WO2019093589) (Year: 2018).*

* cited by examiner

*Primary Examiner* — Anthony J Green
(74) *Attorney, Agent, or Firm* — Maschoff Brennan (57) ABSTRACT

The present invention relates to a cement additive and a method for producing same, wherein carcinogens, including heavy metals such as hexavalent chromium and the like, generated from cement are removed while maintaining the strength and characteristic physical properties of cement. Moreover, the cement additive according to the present invention can provide cement that does not become oxidized by heat into hexavalent chromium.

18 Claims, 11 Drawing Sheets

FIG. 1

Test Report

| | |
|---|---|
| 1. No: CT15-132233 | Reissuance (R1) |
| 2. Client | Date: 2020.04.26 |

Name: JO, Bysong Hak
Address: 105-1407, Cheongjeonhyundai Apt. 35/4 72 Cheongjeon-dong, Jecheon-si, Chungcheongbuk-do, Republic of Korea 3. Date of Test: 2015.12.09 – 2015.12-22
4. Use of Report: Quality Control
5. Test Sample: ECO-FRIENDLY CEMENT-A TYPE
6. Test Method: (1) Notification No.2015-50 of the National Institute of Environmental Research
7. Test Results
   1) ECO-FRIENDLY CEMENT-A TYPE

| Test Item(s) | Unit | Test Method | Test Results | Remarks |
|---|---|---|---|---|
| Lead (Pb)-ES 06402.2 | mg/L | (1) | Not detected (Limit 0.04) | - |
| Cadmium (Cd)-ES 06405.2 | mg/L | (1) | Not detected (Limit 0.04) | - |
| Arsenic (Ar)-ES 06403.3 | mg/L | (1) | Not detected (Limit 0.05) | - |
| Hexavalent Chromium (Cr(VI))-ES 06407.2 | mg/L | (1) | 0.092 | - |
| Mercury (Hg)-ES 06407.2 | mg/L | (1) | 0.0006 | - |

--- End of Report ---

| Affirmation | Tested By<br>Name: Nam Young Jun | Technical Manager<br>Name: Kyu Jin Jung |
|---|---|---|
| Our report apply only to the standards or procedures identified and to the sample(s) tested unless otherwise specified. The test results are not indicative of representative of the qualities of the qualities of the lot from which the sample was taken or of apparently identical or similar products. | | |

2015.12.22

Korea Conformity Laboratories President Kyung Sik Ki

Address: 199, Gasan digital 1-ro, Geumcheon-gu, Seoul, Korea 82-2-2102-2500

Result Inquiry: Environmental Testing Center 82-81-807-6202

FIG. 2

Test Report

|   |   |   |
|---|---|---|
| 1. No: | CT15-132234 | Reissuance (R1) |
| 2. Client | | Date: 2020.04.28 |

Name:    JO, Bysong Hak
    Address:    105-1407, Cheongjeonhyundai Apt. 35/4 72 Cheongjeon-dong, Jecheon-si, Chungcheongbuk-do, Republic of Korea 3. Date of Test:    2015.12.09 – 2015.12-22
4. Use of Report:    Quality Control
5. Test Sample:    ECO-FRIENDLY CEMENT-B TYPE
6. Test Method:    (1) Notification No.2015-50 of the National Institute of Environmental Research
7. Test Results
    1) ECO-FRIENDLY CEMENT-B TYPE

| Test Item(s) | Unit | Test Method | Test Results | Remarks |
|---|---|---|---|---|
| Lead (Pb)-ES 06402.2 | mg/L | (1) | Not detected (Limit 0.04) | - |
| Cadmium (Cd)-ES 06405.2 | mg/L | (1) | Not detected (Limit 0.04) | - |
| Arsenic (Ar)-ES 06403.3 | mg/L | (1) | Not detected (Limit 0.05) | - |
| Hexavalent Chromium (Cr(VI))-ES 06407.2 | mg/L | (1) | 0.085 | - |
| Mercury (Hg)-ES 06407.2 | mg/L | (1) | Not detected (Limit 0.0005) | - |

--- End of Report ---

| Affirmation | Tested By<br>Name: Nam Young Jun | Technical Manager<br>Name: Kyu Jin Jung |
|---|---|---|
| Our report apply only to the standards or procedures identified and to the sample(s) tested unless otherwise specified. The test results are not indicative of representative of the qualities of the qualities of the lot from which the sample was taken or of apparently identical or similar products. |||

2015.12.22

Korea Conformity Laboratories    President Kyung Sik K

Address: 199, Gasan digital 1-ro, Geumcheon-gu, Seoul, Korea 82-2-2102-2500

Result Inquiry: Environmental Testing Center 82-81-807-6202

FIG. 3

Test Report

| | | |
|---|---|---|
| 1. No: | CT16-068677 | Reissuance (R1) |
| 2. Client | | Date: 2020.04.27 |

Name:     JO, Bysong Hak
    Address:     105-1407, Cheongjeonhyundai Apt. 35/4 72 Cheongjeon-dong, Jecheon-si, Chungcheongbuk-do, Republic of Korea 3. Date of Test:     2016.06.15 – 2016.07.06
4. Use of Report:     -(-)
5. Test Sample:     ASIA CEMENT
6. Test Method:     (1) EPA Method 3051A: 2007     (2) KS L 5221:2007
7. Test Results

1) ASIA CEMENT

| Test Item(s) | Unit | Test Method | Test Results | Remarks |
|---|---|---|---|---|
| Cadmium | mg/L | (1) | 2.2 | - |
| Arsenic | mg/L | (1) | 34.65 | - |
| Mercury | mg/L | (1) | 0.06 | - |
| Lead | mg/L | (1) | 87.9 | - |
| Hexavalent Chromium | mg/L | (2) | 24.3 | - |

--- End of Report ---

| Affirmation | Tested By<br>Name: Nam Young Jun | Technical Manager<br>Name: Cho, Young Keun |
|---|---|---|

Our report apply only to the standards or procedures identified and to the sample(s) tested unless otherwise specified. The test results are not indicative of representative of the qualities of the qualities of the lot from which the sample was taken or of apparently identical or similar products.

2016.07.06

Korea Conformity Laboratories     President Kyung Sik KI

Address: 199, Gasan digital 1-ro, Geumcheon-gu, Seoul, Korea 82-2-2102-2500

Result Inquiry: Environmental Testing Center 82-81-807-6202

ABS/%T/Concentration
Use Standard Curve print out: 2016-5-20 p.m. 12:31

| | Date | Time | Sample Name | Cell No. | Wavelength | ABS | %T | Conc. |
|---|---|---|---|---|---|---|---|---|
| 1 | 2016-05-20 | 12:30:26 | Asia C/M | 3 | 540.0 | 0.145 | 71.57 | 28.394 PPM |
| 2 | 2016-05-20 | 12:30:27 | 1 | 4 | 540.0 | 0.035 | 92.25 | 0.771 PPM |
| 3 | 2016-05-20 | 12:30:29 | 2 | 5 | 540.0 | 0.036 | 92.04 | 1.019 PPM |

2016-06-28 P.M. 4:53:03    Page 2 of 3

Concentration units         g/L

Comments:

Zero Report
        Zero         (0.1372)         140.0

Calibration
Collection time             2016-06-28 P.M. 4:47:25

| Standard | Concentration g/L | F | Mean | SD | %RSD | Readings |
|---|---|---|---|---|---|---|
| Std 1 | 0.100 | R | 0.0807 | 0.0000 | 0.09 | 0.0808 0.0807 0.0807 |
| Std 2 | 0.300 | R | 0.1190 | 0.0002 | 0.14 | 0.1191 0.1188 0.1190 |
| Std 3 | 0.500 | R | 0.1984 | 0.0000 | 0.01 | 0.1984 0.1984 0.1984 |

Calibration eqn             Abs = 0.39444*Conc +0.0030)
Correlation Coefficient     0.99898
Calibration time            2016-06-28 P.M. 4:48:21

Analysis
Collection time             2016-06-28 P.M. 4:48:21

| Sample | Concentration g/L | F | Weight g | Volume mL | Factor | Mean | SD | %RSD | Readings |
|---|---|---|---|---|---|---|---|---|---|
| blank | -0.014 | R | 1.0000 | 1.000 | 1.0000 | -0.0087 | 0.0001 | -1.0 | -0.0046 -0.0047 -0.0047 |
| 1 | 10.713 | R | 1.0000 | 100.000 | 100.000 | 0.0433 | 0.0003 | 0.61 | 0.0435 0.0433 0.0430 |
| 2 | 2.360 | R | 1.0000 | 100.000 | 100.000 | 0.0103 | 0.0002 | 2.22 | 0.0105 0.0101 0.0104 |
| 3 | -0.112 | R | 1.0000 | 100.000 | 100.000 | 0.0008 | 0.0001 | 19.5 | 0.0007 0.0009 0.0009 |
| 4 | 0.324 | R | 1.0000 | 100.000 | 100.000 | 0.0023 | 0.0002 | 8.51 | 0.0025 0.0023 0.0021 |
| 5 | -0.305 | R | 1.0000 | 100.000 | 100.000 | -0.0002 | 0.0001 | -77. | -0.0001 -0.0001 -0.0004 |

Results Flags Legend
U = Uncalibrated        O = Overrange
N = Not used in calibration    R = Repeat reading

CEMENT ADDITIVE AND METHOD FOR PRODUCING SAME

TECHNICAL FIELD

The present invention relates to a cement additive and a method for preparing the same, in which carcinogens, including heavy metals such as hexavalent chromium and the like, generated from cement are removed while maintaining the strength and intrinsic physical properties of cement.

BACKGROUND ART

Cement is a mineral fine powder which solidifies in reaction with water, as an inorganic binder having the property of binding materials with each other, and is used as a mixture for putting up a building.

Cement is largely divided into portland cement, white portland cement and blended cement.

Among those cement types, portland cement is obtained by mixing raw materials containing main components of lime, silica, alumina and iron oxide at an appropriate ratio, melting a part thereof, putting an appropriate amount of gypsum into a sintered clinker, and pulverizing a resultant mixture.

In Korea, the directions for using calcined lime were recorded in "Geography Section of the Annals of King Sejong (Sejong Silok Jiriji)" and it is also recorded that such calcined lime was used for the construction of a castle wall in a book titled "Bukhagui" written by Bak Jega.

In the 1960 to 1980's, cement was also manufactured in Korea by using limestone as a raw material due to its geographical features, which are rich in limestone.

Since the 1990's, however, cement has been manufactured by using industrial wastes as a subsidiary or alternative raw material in an annual amount of 3 to 4 million tons during the manufacturing process for cost reduction and industrial waste disposal.

The industrial wastes including steel slag, incineration ash, dyed sludge, chemical waste sludge, semiconductor wastes, etc. were used as raw materials.

Further, the cement including industrial wastes have caused diseases such as atopy, sick house syndrome, etc. due to carcinogens including heavy metals such as hexavalent chromium ($Cr^{6+}$), lead (Pb), mercury (Hg), arsenic (As), cadmium (Cd) and the like.

Lead is absorbed into the body through the respiratory and digestive systems, and causes various symptoms such as anemia, kidney dysfunction, neuromuscular system disorders, etc.

Mercury is vaporized at the room temperature and absorbed into the human body through the respiratory system and skin, thus causing damage to the nervous system, kidneys, skin, internal organs and the like, and leading to death in severe cases.

Arsenic causes nausea, vomiting, and diarrhea even with low doses. Lung and skin cancers are caused by long-term inhalation and ingestion.

Cadmium is a causative agent of itai-itai disease, leading to serious diseases such as bone softening, fracture, etc.

Hexavalent chromium is a non-metallic group 1 carcinogen, which has such a strong oxidative action and high toxicity as to cause a variety of cancers and diseases such as skin cancer, lung cancer, etc. through contact or inhalation.

In developed countries such as Europe, Japan, etc., hexavalent chromium is restricted to 2 mg/kg or less, but in South Korea, it is restricted to 20 mg/kg or less on a voluntary basis.

In recent years, research and development are underway to lower a level of hexavalent chromium in order to manufacture a safe cement, which has solved problems such as harmful and carcinogenic substances, etc. rather than simple cost reduction.

As related art, which serves as a background art of the present invention, there are Korean Registered Patent Publication No. 10-1433135 (hereinafter, "Related Art Document 1"), Korean Registered Patent Publication No. 10-0815289 (hereinafter, "Related Art Document 2"), Korean Registered Patent Publication No. 10-0851929 (hereinafter, "Related Art Document 3"), Japanese Patent Publication No. 5876836 (hereinafter, "Related Art Document 4"), European Registered Patent Publication No. 1533287 (hereinafter, "Related Art Document 5") and Japanese Unexamined Patent Publication No. 2008-273993 (hereinafter, "Related Art Document 6").

Related Art Document 1 relates to a method for reducing hexavalent chromium in a cement composition by using ferrous ethylenediamine sulfate (tetrahydrate) in a hydratable cement as a coordinated metal compound for reducing chromium.

The invention of Related Art Document 1 uses the coordinated metal compound including nitrogen in order to stabilize a hexavalent chromium reducing metal cation, but it cannot be understood whether the strength and intrinsic physical properties of the cement itself are maintained or not.

Related Art Document 2 relates to a cement composition including 0.3 to 0.8 wt % of ferrous sulfate heptahydrate ($FeSO_4 \cdot 7H_2O$) as a cement mortar composition for concrete floor of apartment houses, from which hexavalent chromium is removed.

The invention of Related Art Document 2 uses ferrous sulfate heptahydrate in order to lower a level of hexavalent chromium. However, this decrease in level seems to be caused by a temporary reduction from hexavalent chromium into trivalent chromium by using ferrous sulfate heptahydrate alone.

Further, this cement has a problem of causing various diseases, etc., in that trivalent chromium is oxidized again into hexavalent chromium while being sold in the market.

Related Art Document 3 relates to a cement in which tin hydroxide is mixed during a clinker calcination with an aqueous colloidal suspension of hydroxides of at least one transition element in order to reduce chromium in the cement.

In the invention of Related Art Document 3, it is troublesome that tin hydroxide has an oxidation-reduction potential of 0.96 V and needs to be used only under the condition of pH 2 to 11 so that the content of hexavalent chrome included in the cement has a value of 2 ppm or less.

Related Art Document 4 relates to a cement admixture, a cement composition, and a cement composition including tin sulfate by a method for reducing hexavalent chromium using the same The invention of Related Art Document 4 has a problem in that, when tin sulfate alone is mixed in the cement, a degree of decrease in hexavalent chromium is not so large, thus requiring an expansion agent including free lime.

Related Art Document 5 is an invention, which uses a reducing agent as a dispersion liquid including tin sulfate or ferrous sulfate for reducing chromate in cement.

Since the invention of Related Art Document 5 uses tin sulfate or ferrous sulfate respectively, it is difficult to reduce hexavalent chromium. And, since the viscosity controlling agent is further included therein, the strength and intrinsic physical properties of the cement itself vary, thus making it difficult to be used in buildings.

Related Art Document 6 is an invention in which ferrous sulfate is used as an auxiliary agent for reducing hexavalent chromium into trivalent chromium through a heavy metal elution inhibitor and a method for inhibiting a heavy metal elution.

The invention of Related Art Document 6 has a problem in that the cement includes at least 2.5% of a reductant, a reducing agent and a fixing agent, and oxidization into hexavalent chromium proceeds with time, thus resulting in an increase in a detectable amount thereof.

Accordingly, the present applicants have proposed a cement additive, in which hexavalent chromium is reduced into trivalent chromium and a mixture including charcoal, silicate, ferrous sulfate heptahydrate ($FeSO_4.7H_2O$) and ferrous chloride tetrahydrate ($FeCl_2.4H_2O$) for removing heavy metals may be used in cement.

RELATED ART DOCUMENTS (Related Art Document 1) Korean Registered Patent Publication No. 10-1433135
(Related Art Document 2) Korean Registered Patent Publication No. 10-0815289
(Related Art Document 3) Korean Registered Patent Publication No. 10-0851929
(Related Art Document 4) Japanese Patent Publication No. 5876836
(Related Art Document 5) European Registered Patent Publication No. 01533287
(Related Art Document 6) Japanese Unexamined Patent Publication No. 2008-273993

DISCLOSURE

Technical Problem

To solve the problems of the related art, the present invention provides a cement additive for solving problems of harmful and carcinogenic substances, which have been raised in a method for preparing a cement using wastes.

Further, the cement additive of the present invention provides the same strength and intrinsic physical properties as those of an existing cement even when being mixed in an entire process of cement production or before a cement casting.

In addition, the present invention reduces production costs according to the diversity of a cement processing process.

Furthermore, the cement additive of the present invention provides a cement which may be applied to a wastewater disposal process.

In particular, the cement additive of the present invention provides a cement which is not oxidized into hexavalent chromium by heat.

Technical Solution

To achieve the above objects, the present invention provides a cement additive including 13 to 23 parts by weight of charcoal; 16 to 26 parts by weight of silicate; 16 to 23 parts by weight of ferrous sulfate heptahydrate; and 49 to 59 parts by weight of ferrous chloride tetrahydrate.

The cement additive of the present invention may further include at least one of diatomite; ferric chloride; ferric chloride hexahydrate; tin sulfide; antimony; iron chloride; or iron sulfate.

A cement additive of the present invention includes 13 to 23 parts by weight of diatomite; 16 to 26 parts by weight of silicate; 16 to 23 parts by weight of ferrous sulfate heptahydrate; and 49 to 59 parts by weight of ferrous chloride tetrahydrate.

A cement additive of the present invention includes 13 to 23 parts by weight of charcoal; 16 to 26 parts by weight of tin sulfide; 16 to 23 parts by weight of ferrous sulfate heptahydrate; and 49 to 59 parts by weight of ferrous chloride tetrahydrate.

A cement additive of the present invention includes 13 to 23 parts by weight of charcoal; 16 to 26 parts by weight of silicate; 16 to 23 parts by weight of antimony; and 49 to 59 parts by weight of ferrous chloride tetrahydrate.

A cement additive of the present invention includes 13 to 23 parts by weight of charcoal; 16 to 26 parts by weight of silicate; 16 to 23 parts by weight of ferrous sulfate heptahydrate; and 49 to 59 parts by weight of at least one of ferric chloride, ferric chloride hexahydrate, iron chloride or iron sulfate.

A cement mixture of the present invention includes a cement additive included in a cement in an amount of 0.1 to 0.8 wt %.

The cement mixture of the present invention may further include 10 wt % of less of calcium stearate.

Advantageous Effects

The present invention provides a cement additive, which solves a problem of harmful and carcinogenic substances, which is raised in a method for preparing a cement using wastes, thus having an effect in that heavy metal materials such as lead, cadmium, arsenic, mercury, etc. are not detected.

In particular, the present invention has an effect of remarkably reducing hexavalent chromium out of carcinogens included in the cement.

Further, the cement additive of the present invention has an effect of maintaining the same strength and intrinsic physical properties as those of an existing cement even when being mixed in an entire process of cement production or before a cement placement.

In addition, the present invention has an effect of reducing production costs according to the diversity of a cement processing process.

Furthermore, the cement additive of the present invention may provide a cement which may be applied to a wastewater disposal process.

In particular, the cement additive of the present invention can provide a cement which is not oxidized into hexavalent chromium by heat.

BEST MODE

Hereinafter, the present invention will be described in more detail through the following embodiments.

The objects, features and advantages of the present invention will be easily understood through the following embodiments.

The present invention is not limited to the embodiments disclosed herein, but may be realized in different forms. The embodiments disclosed herein are provided to sufficiently deliver the spirit of the present invention to those skilled in the art to which the present invention pertains, and should be understood to encompass all the modifications, equivalents or substitutes included in the technical ideas and technical scope of the present invention.

Thus, the present invention is not limited to the following embodiments, and should be understood to encompass all the modifications included in the technical ideas and technical scope of the present invention. In other words, those skilled in the art will appreciate that the present invention may be variously modified or changed by the addition, modification, deletion, annexation or the like of components without departing from the spirit of the present invention, which is described in the scope of the claims, and such modification or change may be also included in the protection scope of the present invention.

The present invention may be applied with various modifications and have various embodiments, but specific embodiments are illustrated in the drawings and described in detail. In the drawings, the sizes of the elements or the relative sizes between the elements may be somewhat exaggerated for a clear understanding of the present invention. Further, the shape of the elements shown in the drawings may be somewhat modified by variations in the manufacturing process or the like.

Thus, the embodiments disclosed in the present specification should not be limited to the shapes shown in the drawings, unless otherwise specified, and should be understood to include some degree of modification.

On the other hand, various embodiments of the present invention may be combined with any other embodiments, unless otherwise clearly indicated. Any feature that is indicated as particularly preferred or advantageous may be combined with any other feature or features that are indicated as preferred or advantageous. In other words, various aspects, features, embodiments or implementations of the present invention may be used alone or in various combinations.

It should be understood that the terminology used in the present specification is provided only for describing specific embodiments and is not intended to be limited by the claims. All technical and scientific terms used in the present specification have the same meaning as commonly understood by those skilled in the art, unless otherwise stated. The terms of a singular form may include plural forms unless otherwise specified.

In the description of the present invention, a detailed description of known arts incorporated herein will be omitted when it may make the subject matter of the present invention unnecessarily unclear.

A content ratio of the composition in the embodiments of the present invention represents "parts by weight" unless otherwise specified.

Example 1

A cement additive of the present invention includes charcoal and silicate in order to reduce heavy metals. To reduce hexavalent chromium into trivalent chromium, the cement additive may include ferrous sulfate heptahydrate and ferrous chloride tetrahydrate, but are not limited thereto.

More particularly, the cement additive may include 13 to 23 parts by weight of charcoal; 16 to 26 parts of silicate; 15 to 24 parts by weight of ferrous sulfate heptahydrate; and 49 to 59 parts by weight of ferrous chloride tetrahydrate, preferably 15 to 21 parts by weight of charcoal; 18 to 24 parts of silicate; 17 to 22 parts of ferrous sulfate heptahydrate; and 51 to 57 parts by weight of ferrous chloride tetrahydrate, and more preferably 17 to 18 parts by weight of charcoal; 19 to 21 parts by weight of silicate; 18 to 19 parts by weight of ferrous sulfate heptahydrate; and 52 to 54 parts by weight of ferrous chloride tetrahydrate, but is not limited thereto.

The charcoal has many micropores and thus is excellent in adsorption capacity, so that the charcoal is used to adsorb heavy metals and reduced trivalent chromium to be kept in an inactive state.

The charcoal used in the present invention may include at least one of pine charcoal, bamboo charcoal, oak charcoal (oak tree charcoal) or ginkgo charcoal, preferably at least one of bamboo charcoal or oak charcoal, and more preferably oak charcoal, but is not limited thereto.

Further, the charcoal used in the present invention may include a powder form, but is not limited thereto.

A pore diameter of charcoal varies depending on a type of wood used. An average diameter of pores may be 1 to 10 μm for pine charcoal, 3 to 15 μm for bamboo charcoal, 2 to 10 μm for oak charcoal, and 3 to 10 μm for ginkgo charcoal.

The oak charcoal used may include an oak charcoal made at an intermediate temperature of 500 to 900° C. or at a high temperature of 1,100 to 1,300° C., but is not limited thereto.

Further, the oak charcoal made at a high temperature includes a more number of micropores compared to the oak charcoal made at an intermediate temperature. Thus, it is most preferable to use the oak tree charcoal made at a high temperature, but is not limited thereto.

In particular, unlike other charcoals, the oak charcoal has many micropores and thus is very excellent in adsorption capacity and has an excellent effect of removing heavy metals and hexavalent chromium.

The bamboo charcoal used may include a bamboo charcoal made at a high temperature of 1,000° C. or higher, preferably at a high temperature of 1,100 to 1,300° C., but is not limited thereto.

In particular, the bamboo charcoal has an effect of anions, far-infrared ray, electromagnetic shielding, deodorization and air purification, water purification, antibiotic action and detoxification, supply of minerals and humidity control, and has an excellent rate of adsorption of heavy metals.

The silicate is a compound including anions in which at least one central atom of silicon is surrounded by negatively charged ligands, and further enhances corrosion resistance.

The silicate used in the present invention has a micropore structure while neutralizing cations of heavy metals with anions, thereby adsorbing heavy metals and reduced trivalent chromium and coating the periphery thereof to be kept in an active state.

The ferrous sulfate heptahydrate is dissolved in water in the form of white-and-pale green crystal or crystalline powder, but is not dissolved in alcohol or ether. When being left alone in air, yellowish brown basic ferric sulfate (Fe(OH)SO$_4$) is generated from a surface thereof.

The ferrous chloride tetrahydrate is a light-green deliquescent crystal with the specific gravity of 1.926 g/cm$^3$, being dissolved in water and alcohol. When this hydrate is heated in air, it is decomposed into an iron oxide (Fe$_2$O$_3$).

The ferrous sulfate heptahydrate and the ferrous chloride tetrahydrate used in the present invention cause a chromium reduction reaction through Fe$^{2+}$, which is an electron donor, so that hexavalent chromium is reduced into trivalent chromium.

The cement additive may be prepared by mixing in a conventional manner.

Further, the cement additive used may include a form of powder or aqueous solution, preferably a powder form, but is not limited thereto.

In addition, the cement additive may further include 0.1 to 5 parts by weight of diatomite, ferric chloride, ferric chloride hexahydrate (FeCl$_3$.6H$_2$O), tin sulfide (SnS), antimony, iron chloride or iron sulfate, but is not limited thereto.

MODE FOR INVENTION

Example 2

The materials used in the cement additive prepared in above Example 1 may be replaced with other substitute materials due to discontinuation of production, economic problems, toxicity problems or the like and the detailed configuration thereof is as follows.

The charcoal used in Example 1 may be substituted with diatomite, but is not limited thereto.

The cement additive in which charcoal is substituted with diatomite may include 13 to 23 parts by weight of diatomite; 16 to 26 parts of silicate; 15 to 24 parts by weight of ferrous sulfate heptahydrate; and 49 to 59 parts by weight of ferrous chloride tetrahydrate, preferably 15 to 21 parts by weight of diatomite; 18 to 24 parts of silicate; 17 to 22 parts of ferrous sulfate heptahydrate; and 51 to 57 parts by weight of ferrous chloride tetrahydrate, and more preferably 17 to 18 parts by weight of diatomite; 19 to 21 parts by weight of silicate; 18 to 19 parts by weight of ferrous sulfate heptahydrate; and 52 to 54 parts by weight of ferrous chloride tetrahydrate, but is not limited thereto.

In the present invention, diatomite is a natural clay having an amorphous non-crystalline structure and has such low density and high porosity as to adsorb heavy metals and reduced trivalent chromium to be kept in an inactive state.

In the present invention, the rest of materials and methods excluding diatomite are the same as shown in Example 1.

Example 3

The materials used in the cement additive prepared in above Example 1 may be replaced with other substitute materials due to discontinuation of production, economic problems, toxicity problems or the like and the detailed configuration thereof is as follows.

The silicate used in Example 1 may be substituted with tin sulfide, but is not limited thereto.

The cement additive in which silicate is substituted with tin sulfide may include 13 to 23 parts by weight of charcoal; 16 to 26 parts of tin sulfide; 16 to 23 parts by weight of ferrous sulfate heptahydrate; and 49 to 59 parts by weight of ferrous chloride tetrahydrate, preferably 15 to 21 parts by weight of charcoal; 18 to 24 parts of tin sulfide; 17 to 22 parts of ferrous sulfate heptahydrate; and 51 to 57 parts by weight of ferrous chloride tetrahydrate, and more preferably 17 to 18 parts by weight of charcoal; 19 to 21 parts by weight of tin sulfide; 18 to 19 parts by weight of ferrous sulfate heptahydrate; and 52 to 54 parts by weight of ferrous chloride tetrahydrate, but is not limited thereto.

In the present invention, tin sulfide neutralizes cations of heavy metals with anions, thereby keeping the heavy metals in an inactive state.

In the present invention, the rest of materials and methods excluding tin sulfide are the same as shown in Example 1.

Example 4

The materials used in the cement additive prepared in above Example 1 may be replaced with other substitute materials due to discontinuation of production, economic problems, toxicity problems or the like and the detailed configuration thereof is as follows.

The ferrous sulfate heptahydrate used in Example 1 may be substituted with antimony, but is not limited thereto.

The cement additive in which ferrous sulfate heptahydrate is substituted with antimony may include 13 to 23 parts by weight of charcoal; 16 to 26 parts of silicate; 16 to 23 parts by weight of antimony; and 49 to 59 parts by weight of ferrous chloride tetrahydrate, preferably 15 to 21 parts by weight of charcoal; 18 to 24 parts of silicate; 17 to 22 parts of antimony; and 51 to 57 parts by weight of ferrous chloride tetrahydrate, and more preferably 17 to 18 parts by weight of charcoal; 19 to 21 parts by weight of silicate; 18 to 19 parts by weight of antimony; and 52 to 54 parts by weight of ferrous chloride tetrahydrate, but is not limited thereto.

In the present invention, the rest of materials and methods excluding antimony are the same as shown in Example 1.

Example 5

The materials used in the cement additive prepared in above Example 1 may be replaced with other substitute materials due to discontinuation of production, economic problems, toxicity problems or the like and the detailed configuration thereof is as follows.

The ferrous chloride tetrahydrate used in Example 1 may be substituted with at least one of ferric chloride, ferric chloride hexahydrate, iron chloride or iron sulfate, but is not limited thereto.

The cement additive in which ferrous chloride tetrahydrate is substituted with at least one of ferric chloride, ferric chloride hexahydrate, iron chloride or iron sulfate may include 13 to 23 parts by weight of charcoal; 16 to 26 parts of silicate; 16 to 23 parts by weight of ferrous sulfate heptahydrate; and 49 to 59 parts by weight of at least one of ferric chloride, ferric chloride hexahydrate, iron chloride or iron sulfate, preferably 15 to 21 parts by weight of charcoal; 18 to 24 parts of silicate; 17 to 22 parts of ferrous sulfate heptahydrate; and 51 to 57 parts by weight of at least one of ferric chloride, ferric chloride hexahydrate, iron chloride or iron sulfate, and more preferably 17 to 18 parts by weight of charcoal; 19 to 21 parts by weight of silicate; 18 to 19 parts by weight of ferrous sulfate heptahydrate; and 52 to 54 parts by weight of at least one of ferric chloride, ferric chloride hexahydrate, iron chloride or iron sulfate, but is not limited thereto.

In the present invention, ferric chloride, ferric chloride hexahydrate, iron chloride or iron sulfate cause a chromium reduction reaction through $Fe^2$, which is an electron donor, so that hexavalent chromium is reduced into trivalent chromium to be kept in an inactive state.

In the present invention, the rest of materials and methods excluding ferric chloride, ferric chloride hexahydrate, iron chloride or iron sulfate are the same as shown in Example 1.

Example 6

Figure 1:
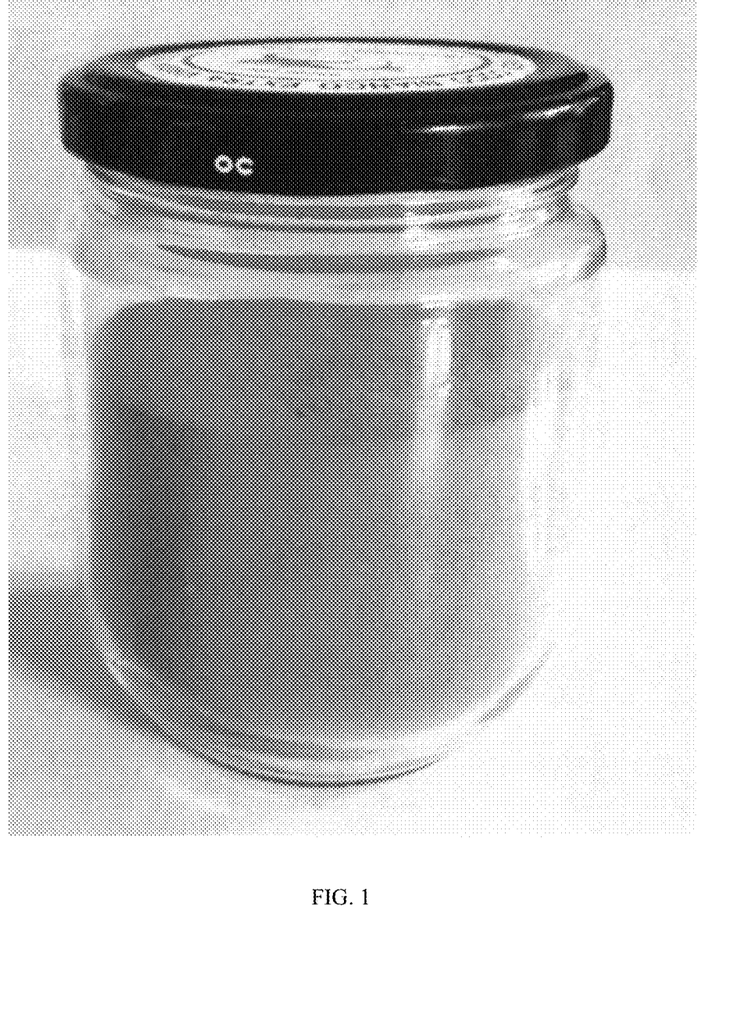
FIG. 1 is a view showing a cement additive prepared by a preparation method of the present invention.

FIG. 1 is a view showing a cement additive prepared by a preparation method of the present invention.

Any one of the cement additives of Examples 1 to 5 may be mixed in an entire process of cement production or before a cement placement, but is not limited thereto.

In the present invention, a cement mixture means a mixture of a cement and a cement additive.

The cement used in the present invention may include a cement prepared by a generally known technique, but is not limited thereto.

The cement mixture may include a cement additive in a cement in an amount of 0.1 to 0.8 wt %, preferably 0.2 to 0.7 wt %, and more preferably 0.3 to 0.6 wt %, but is not limited thereto, so that heavy metals, carcinogens, etc., included in the cement may be non-detected or reduced.

If less than 0.1 wt % of the cement additive is included in the cement, the heavy metals may be detected. If more than 0.8 wt % of the cement additive is included therein, the intrinsic physical properties of the cement may be changed.

Further, if less than 0.2 wt % of the cement additive is included in the cement, hexavalent chromium may be detected in an amount of 2.5 ppm or more. If more than 0.7 wt % of the cement additive is included therein, the strength of the cement may be changed.

In addition, if less than 0.3 wt % of the cement additive is included in the cement, hexavalent chromium may be detected in an amount of 2 ppm or more. If more than 0.6 wt % of the cement additive is included therein, the strength of the cement may be changed.

The cement additive may be also used in the cement, concrete or mortar, but is not limited thereto.

To further increase the strength of the cement in the present invention, the cement mixture may further include calcium stearate in an amount of 10 wt % or less, preferably 1 to 6 wt %, more preferably 2 to 5 wt %, and most preferably 2 to 3 wt %, but is not limited thereto.

Since the calcium stearate has a property of not absorbing water, the strength of the cement can be enhanced due to improvement in water repellency and waterproofness.

Further, if more than 10 wt % of calcium stearate is mixed in the cement mixture, strength development may be lowered.

In addition, if less than 2 wt % of calcium stearate is mixed in the cement mixture, the effect of water repellency and waterproofness may be insignificant. If more than 3 wt % of calcium stearate is mixed therein, the production cost may be increased and thus may not be economical.

Experimental Example 1

An experiment was performed to compare heavy metals and hexavalent chromium between a cement including the cement additives prepared based on Example 1 of the present invention and a conventional cement.

The experimental group used a cement, in which iron sulfate was not included and the cement additive of Example 1 was included.

The control group A used a cement in which iron sulfate was included and the cement additive of Example 1 was added, and the control group B used Asia Cement which was commercially available.

Cadmium, arsenic, mercury and lead were used as heavy metals and tested according to the EPA method 3051A: 2007 testing method.

Hexavalent chromium was tested according to the EPA method 3051A: 2007 testing method or the KS L 5221: 2007 testing method.

A following table 1 shows a summary of elution testing results on heavy metals and hexavalent chromium.

TABLE 1

| Test Item (mg/L) | Experimental group | Control group A | Control group B |
|---|---|---|---|
| Lead (limit of quantitation 0.04) | Not detected | Not detected | 87.9 |
| Cadmium (limit of quantitation 0.04) | Not detected | Not detected | 2.2 |
| Arsenic (limit of quantitation 0.05) | Not detected | Not detected | 34.65 |
| Mercury (limit of quantitation 0.0005) | Not detected | 0.0006 | 0.06 |
| Hexavalent chromium | 0.085 | 0.092 | 24.3 |

Figure 2:
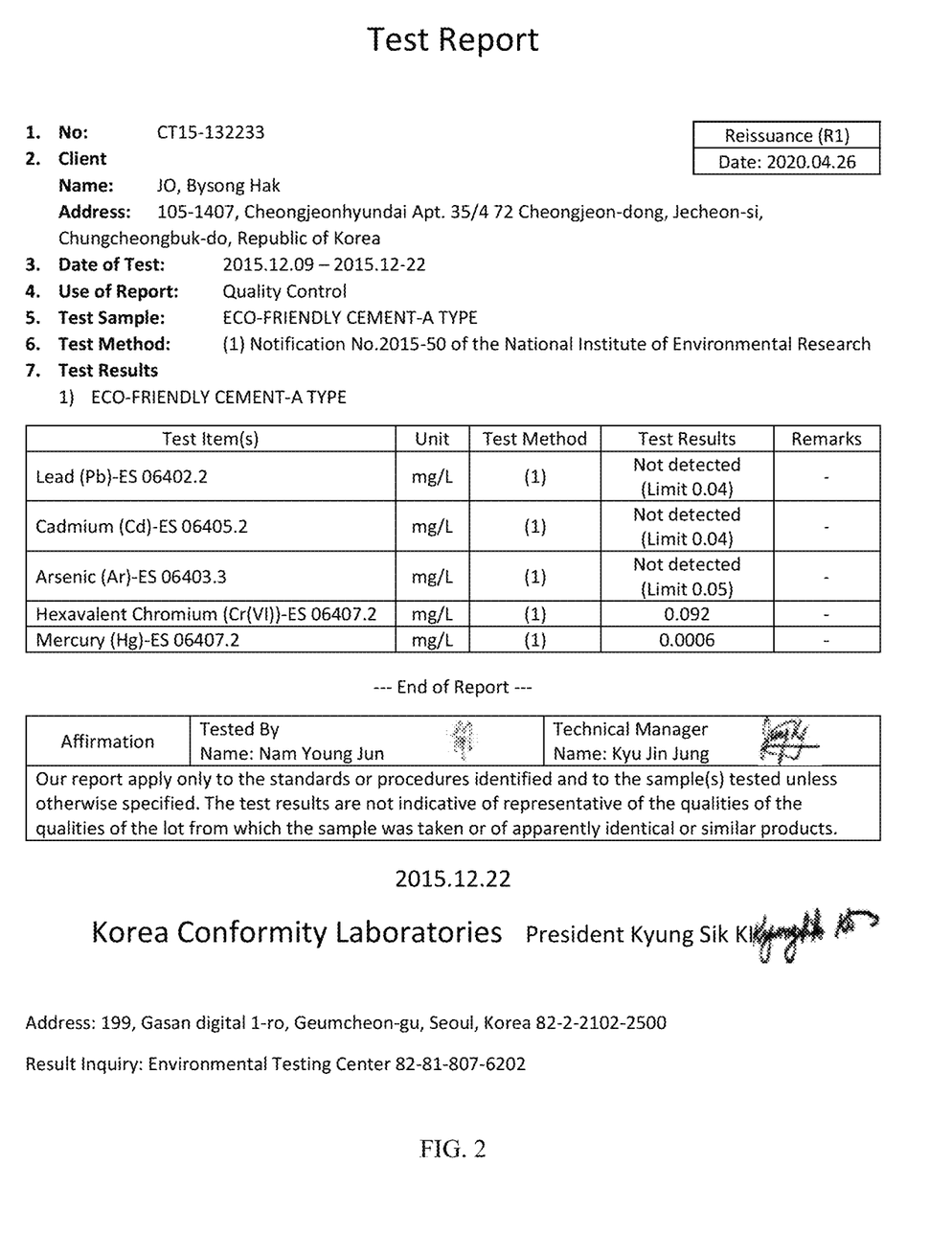
FIG. 2 is a view showing a test report on elution of heavy metals and hexavalent chromium of a cement not including the cement additive of the present invention as well as iron sulfate.
Figure 3:
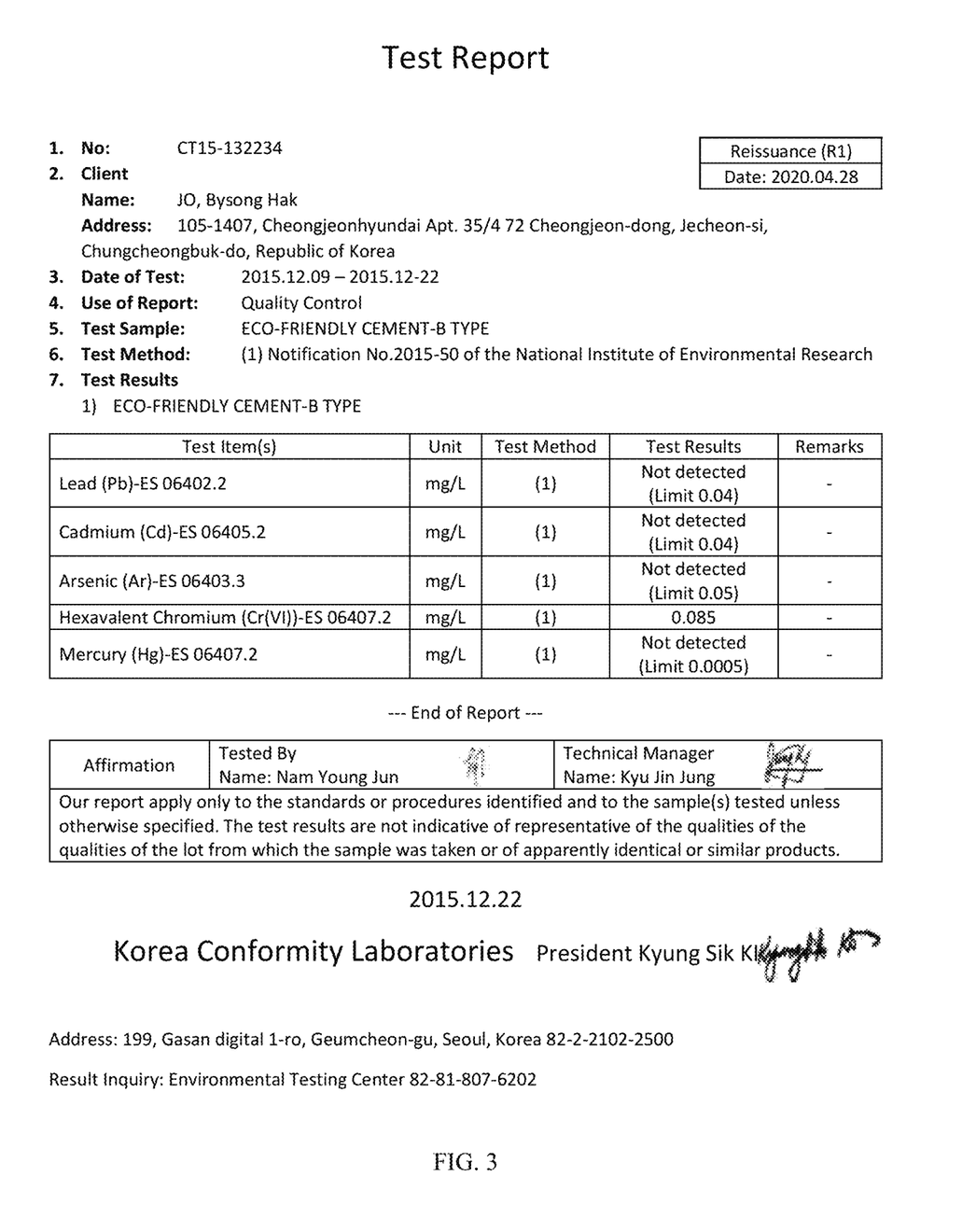
FIG. 3 is a view showing a test report on elution of heavy metals and hexavalent chromium of a cement including the cement additive of the present invention as well as iron sulfate.
Figure 4:
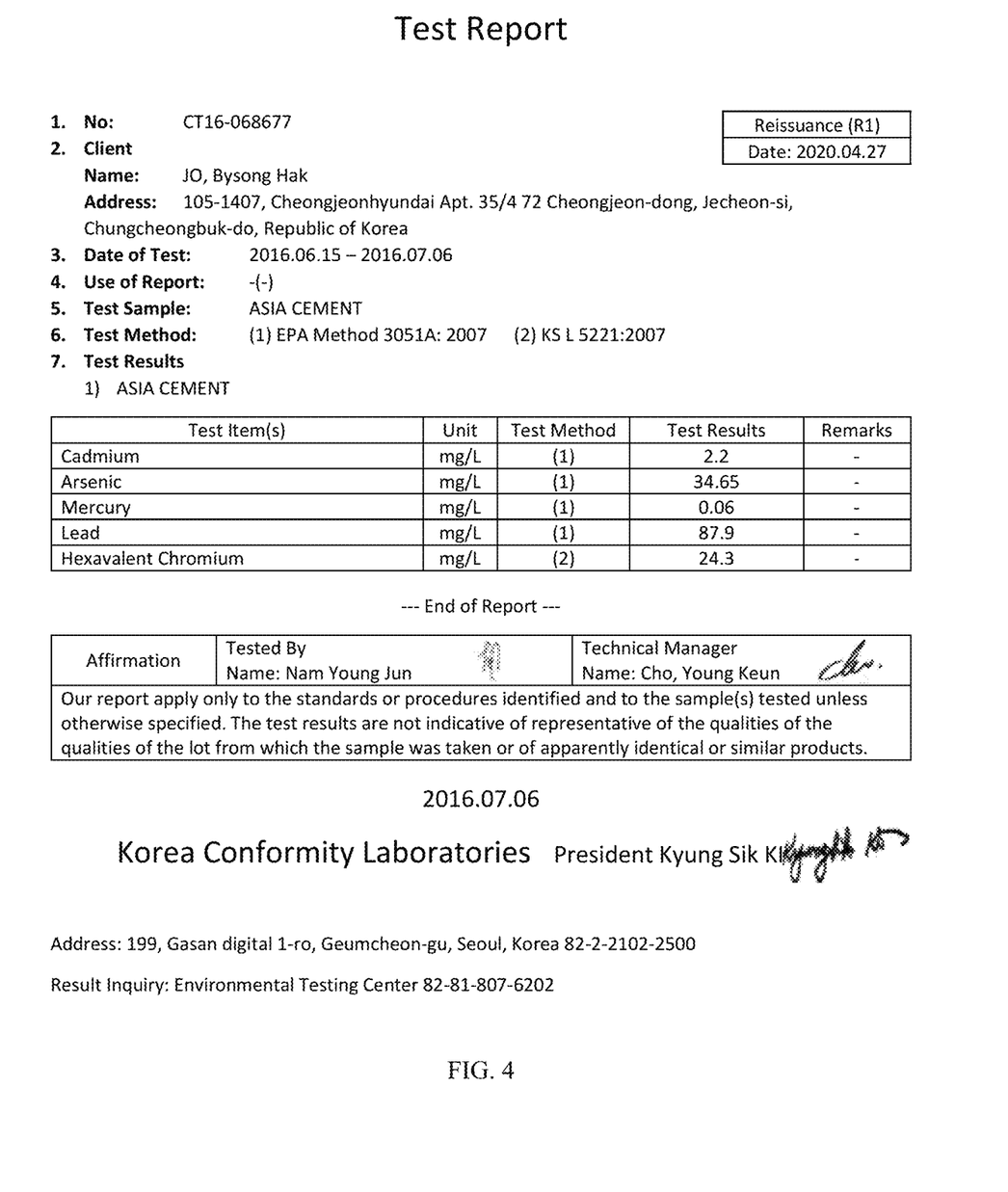
FIG. 4 is a view showing a test report on elution of heavy metals and hexavalent chromium of a conventional cement.

Referring to Table 1 and FIGS. 2 to 4, out of heavy metals such as lead, cadmium, arsenic and mercury, the lead was not detected from the experimental group and the control group A, but most detected from the control group B in an amount of 87.9 mg/L.

Assuming that the experimental group and the control group A had 0.03 mg/L equal to or below the lower limit of quantification, if the cement additive is used, it can be inferred that lead is reduced by 2,930 times or more compared to the control group B.

Cadmium was not detected from the experimental group and the control group A, but most detected from the control group B in an amount of 2.2 mg/L.

Assuming that the experimental group and the control group A had 0.03 mg/L equal to or below the lower limit of quantification, if the cement additive is used, it can be inferred that cadmium is reduced by about 73 times or more compared to the control group B.

Arsenic was not detected from the experimental group and the control group A, but most detected from the control group B in an amount of 34.65 mg/L.

Assuming that the experimental group and the control group A had 0.04 mg/L equal to below the lower limit of quantification, if the cement additive is used, it can be inferred that arsenic is reduced by about 866 times or more compared to the control group B.

Mercury was not detected from the experimental group, but most detected from the control group B in an amount of 0.06 mg/L, followed by the control group A in an amount of 0.0006 mg/L.

Assuming that the experimental group had 0.0004 mg/L equal to below the lower limit of quantification, if the cement additive is used, it can be inferred that mercury is reduced by 150 times or more compare to the control group B.

In particular, as a result of testing depending on whether iron sulfate is included in the cement or not with regard to the experimental group and the control group A, it was confirmed that mercury only is detected from the control group A including iron sulfate. Accordingly, if iron sulfate is included in the cement, it may affect the detection of mercury.

Hexavalent chromium, which is another carcinogen, was most detected from the control group B in an amount of 24.3 mg/L. In the experimental group and the control group A, hexavalent chromium was detected in an amount of 0.085 mg/L and 0.092 mg/L, respectively. Accordingly, if the cement additive is used, it can be confirmed that hexavalent chromium is decreased by about 264 to 286 times compared to the control group B.

Further, if the cement additive of the present invention is included in the cement, it can be understood that no heavy metal is detected at all, and hexavalent chrome is detected at a remarkably low level. From the above results, it can be inferred that the present invention may be applied to a wastewater treatment process.

Experimental Example 2

An experiment was performed to compare hexavalent chromium between a cement including the cement additive prepared based on Example 1 of the present invention and a conventional cement.

The experimental group used the cement which includes 0.5 wt % of the cement additive by using an electronic scale.

The control group C used the cement which includes 0.5 wt % of the cement additive by using an electronic scale, and the control group D used Asia Cement which was commercially available.

A following table 2 shows a summary of elution testing results on hexavalent chromium.

TABLE 2

|  | Wavelength | ABS | % T | Hexavalent chromium (ppm) |
|---|---|---|---|---|
| Experimental group | 540 | 0.035 | 92.25 | 0.771 |
| Control group C | 540 | 0.036 | 92.04 | 1.019 |
| Control group D | 540 | 0.145 | 71.57 | 28.394 |

Figure 5:
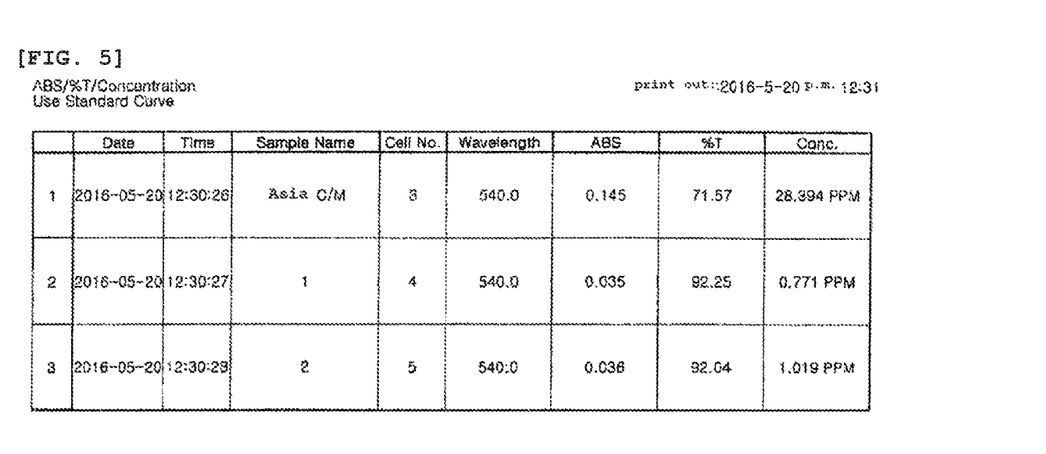
FIG. 5 is a view showing a test result on elution of hexavalent chromium in a cement including the cement additive of the present invention as well as a conventional cement.

Referring to Table 2 and FIG. 5, it can be confirmed that there is no change in a cement wavelength of the experimental group and the control groups C and D. Accordingly, it can be understood that there is no change in the physical properties of the cement.

Hexavalent chromium was least detected in an amount of 0.771 ppm from the experimental group, but was detected in an amount of 1.019 ppm and 28.394 ppm from the control group C and the control group C, respectively. Accordingly, in case of using the cement additive, it can be understood that hexavalent chrome is reduced by about 27 to 36 times compared to the control group D.

Further, if the cement additive of the present invention is included in the cement, it can be confirmed that hexavalent chrome is remarkably less detected without a great change in the intrinsic physical properties of the cement.

Experimental Example 3

An experiment was performed to compare hexavalent chromium depending on a content of the cement additive prepared based on Example 1 of the present invention.

The experimental group used the cement which includes the cement additive in an amount of 0.3, 0.4, 0.5 and 0.6 wt %, while the control group used Tongyang Cement which is exported to Japan.

A following table 3 shows a summary of the experimental results.

TABLE 3

| Sample |  | Hexavalent chromium (g/L) | F | Weight g | Volume mL | Factor | Mean | SD | % RSD | Readings |
|---|---|---|---|---|---|---|---|---|---|---|
| Control group | For export to Japan | 10.713 | R | 1.0000 | 100.000 | 100.000 | 0.0433 | 0.0003 | 0.61 | 0.0435 0.0433 0.0430 |
| Experimental group (wt %) | 0.3 | 2.360 | R | 1.0000 | 100.000 | 100.000 | 0.0103 | 0.0002 | 2.22 | 0.0105 0.0101 0.0104 |
|  | 0.4 | 0.112 | R | 1.0000 | 100.000 | 100.000 | 0.0006 | 0.0001 | 19.5 | 0.0007 0.0006 |

TABLE 3-continued

| Sample | Hexavalent chromium (g/L) | F | Weight g | Volume mL | Factor | Mean | SD | % RSD | Readings |
|---|---|---|---|---|---|---|---|---|---|
| 0.5 | 0.324 | R | 1.0000 | 100.000 | 100.000 | 0.0023 | 0.0002 | 8.51 | 0.0005<br>0.0025<br>0.0023<br>0.0021 |
| 0.6 | 0.305 | R | 1.0000 | 100.000 | 100.000 | −0.0002 | 0.0001 | −77 | −0.0001<br>−0.0001<br>−0.0004 |

Figure 6:
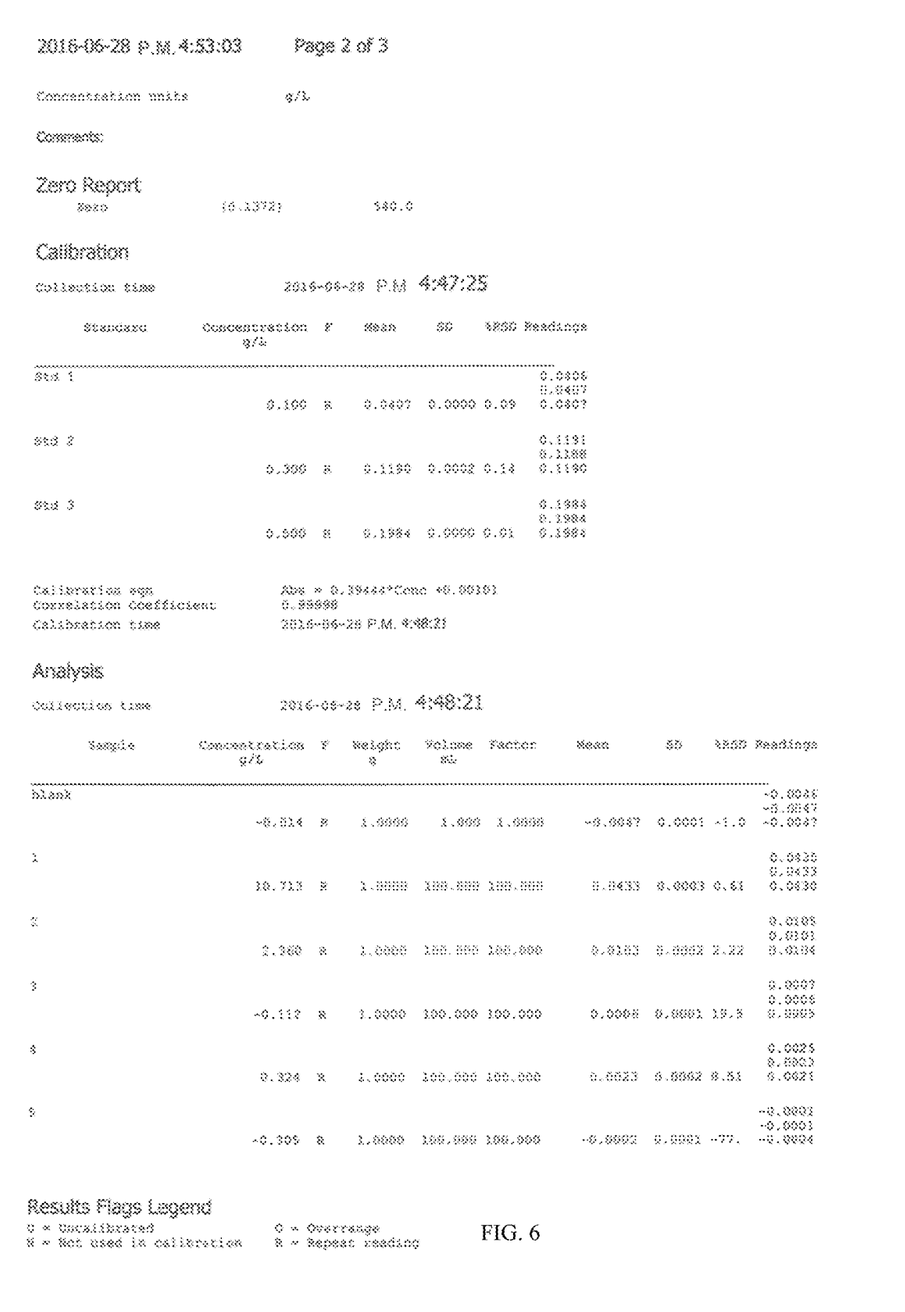
FIGS. 6 and 7 are views showing test results on elution of hexavalent chromium according to a content of the cement additive of the present invention.
Figure 7:
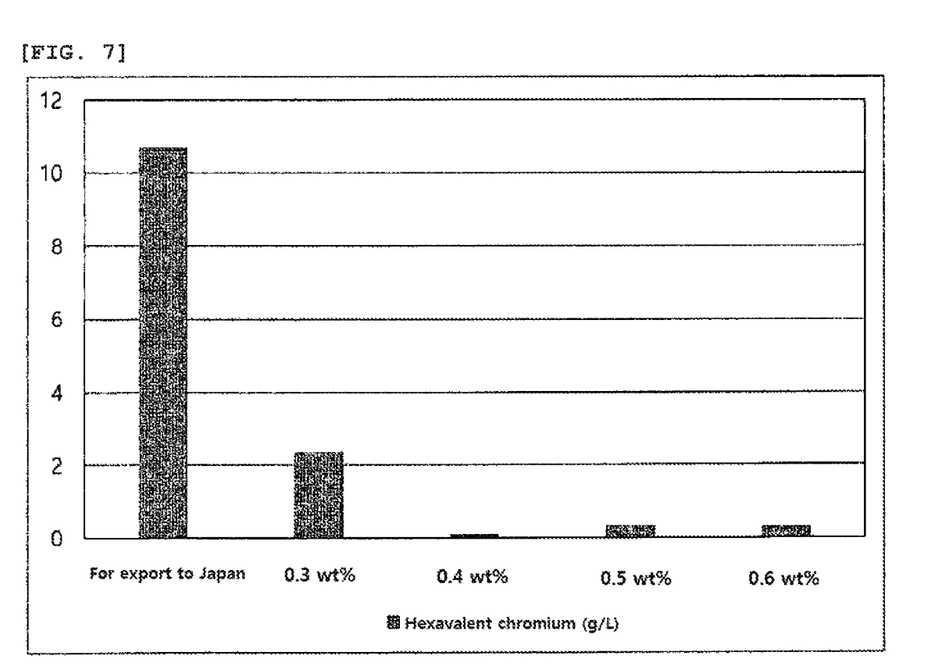

Referring to Table 3 and FIGS. 6 and 7, it can be understood that there is no change in weight, volume, etc., between the experimental group and the control group.

Hexavalent chromium was most detected in an amount of 10.713 g/L from the control group. Out of the experimental groups, hexavalent chromium was most detected in an amount of 2.36 g/L from the group including 0.3 wt % of the cement additive.

Further, hexavalent chromium was secondly most detected in an amount of 0.324 g/L from the experimental group including 0.5 wt % of the cement additive, and was thirdly most detected in an amount of 0.305 g/L from the experimental group including 0.6 wt % of the cement additive.

In addition, it was confirmed that hexavalent chromium is least detected in an amount of 0.112 g/L from the experimental group including 0.4 wt % of the cement additive. Accordingly, it can be understood that hexavalent chromium in the experimental group is detected 33 to 96 times less compared to the control group.

It can be also understood that a detection amount of hexavalent chromium is decreased as a content of the cement additive included in the cement is increased.

Further, it can be inferred that at least 0.3 wt % of the cement additive needs to be included in the cement, so that hexavalent chromium may be detected in an amount of 2.5 g/L or less from the cement.

Experimental Example 4

An experiment was performed to visually confirm hexavalent chromium generated from a cement including the cement additive prepared based on Example 1 of the present invention as well as a conventional cement.

The experimental group used the cement which includes 0.5 wt % of the cement additive by using an electronic scale.

The control group C used the cement which includes 0.5 wt % of the cement additive by using a common scale.

The control group D used Asia Cement which was commercially available.

The control group E used Sungshin Cement which was commercially available.

Figure 8:
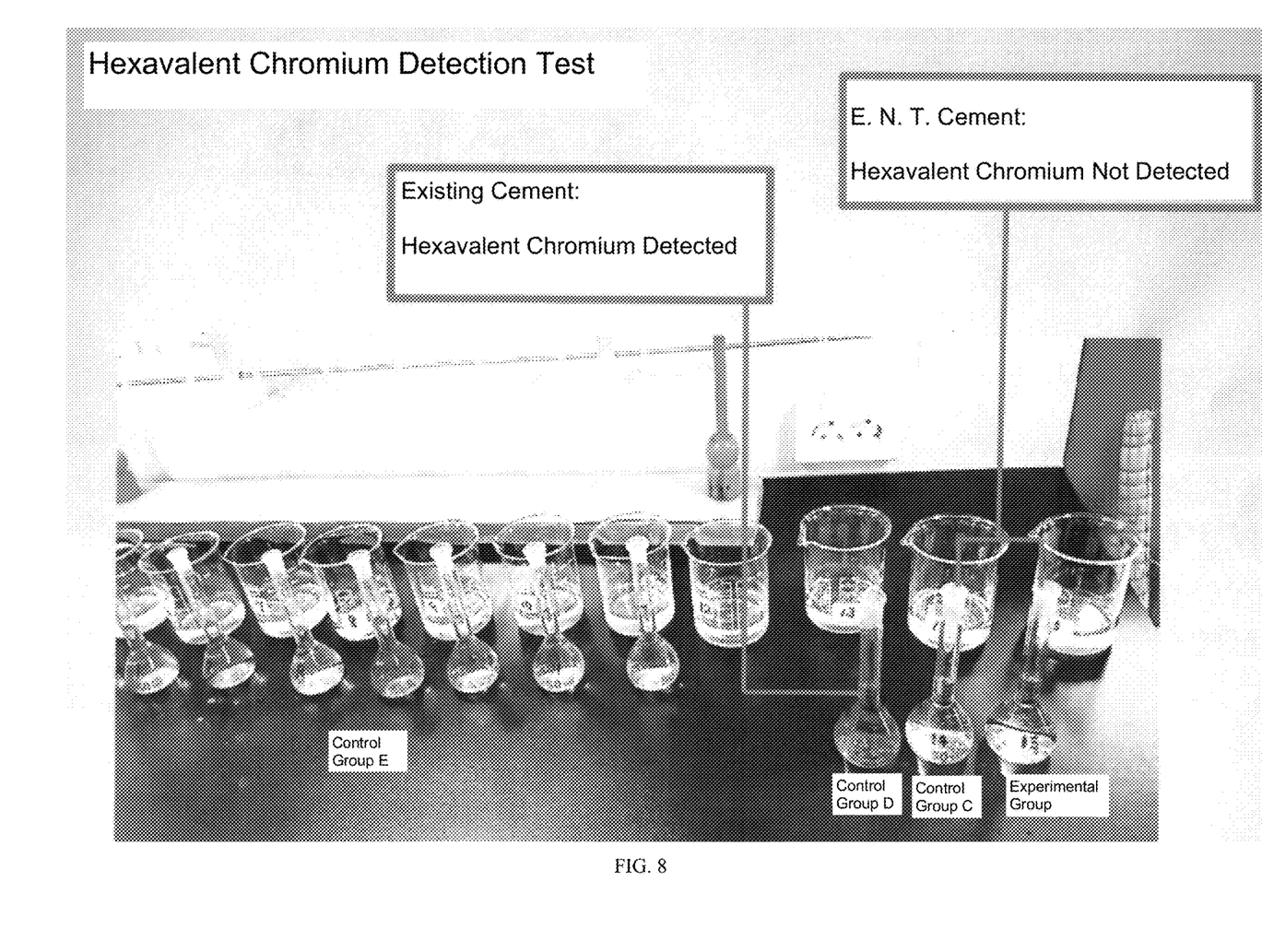
FIG. 8 is a view showing a test result of visually confirming the detection of hexavalent chromium in a cement including the cement additive of the present invention as well as a conventional cement.

Referring to FIG. 8, it was visually confirmed that hexavalent chromium is not detected from the fact that the specimens of the experimental group and the control group C are transparent.

It was visually confirmed that hexavalent chromium is detected from the fact that the specimens of the control groups D and E are tinged with red.

Further, it can be predicted that hexavalent chromium is more included in the specimen of the control group D from the fact that the specimen of the control group D takes on a darker red color compared to the specimen of the control group E.

Experimental Example 5

An experiment on survival of goldfish was performed by using a cement including the cement additive prepared based on Example 1 as well as a conventional cement.

Figure 9:
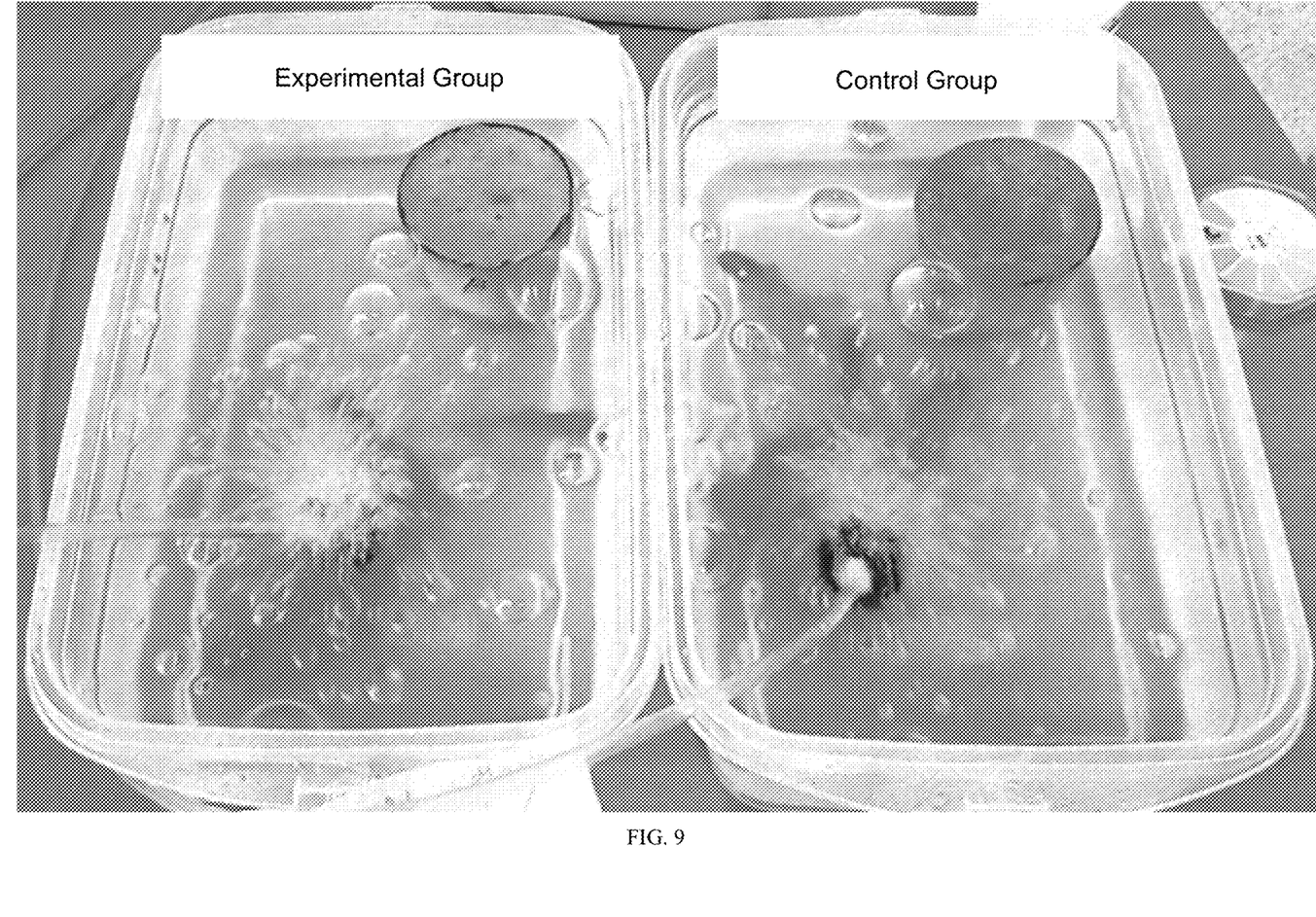
FIG. 9 is a view showing a picture which is obtained by experimenting on goldfish survival by using a cement including the cement additive of the present invention as well as a conventional cement.

As shown in FIG. 9, the survival of goldfish was confirmed by pouring the cements of the experimental group and the control group into each of test piece specimens of two water tanks.

The experimental group used the cement including the cement additive prepared based on Example 1, while the control group used the conventional cement.

A following table 4 shows the results of experiment on survival of goldfish.

TABLE 4

|  | Experimental group | Control group |
|---|---|---|
| Survival of goldfish | Good health | Survive for about 8 hours |

Referring to Table 4, it was confirmed that the goldfish of the experimental group survives, but the goldfish of the control group is slow-moving in four hours later, and the goldfish all dies in eight hours later.

Thus, it can be inferred that heavy metal is not eluted from the cement including the cement additive of the present invention.

Experimental Example 6

An experiment was performed to confirm an anion level by using a cement including the cement additive prepared based on Example 1 of the present invention as well as a conventional cement.

The experimental group used the cement including the cement additive prepared on Example 1, while the control group used the conventional cement.

Figure 10:
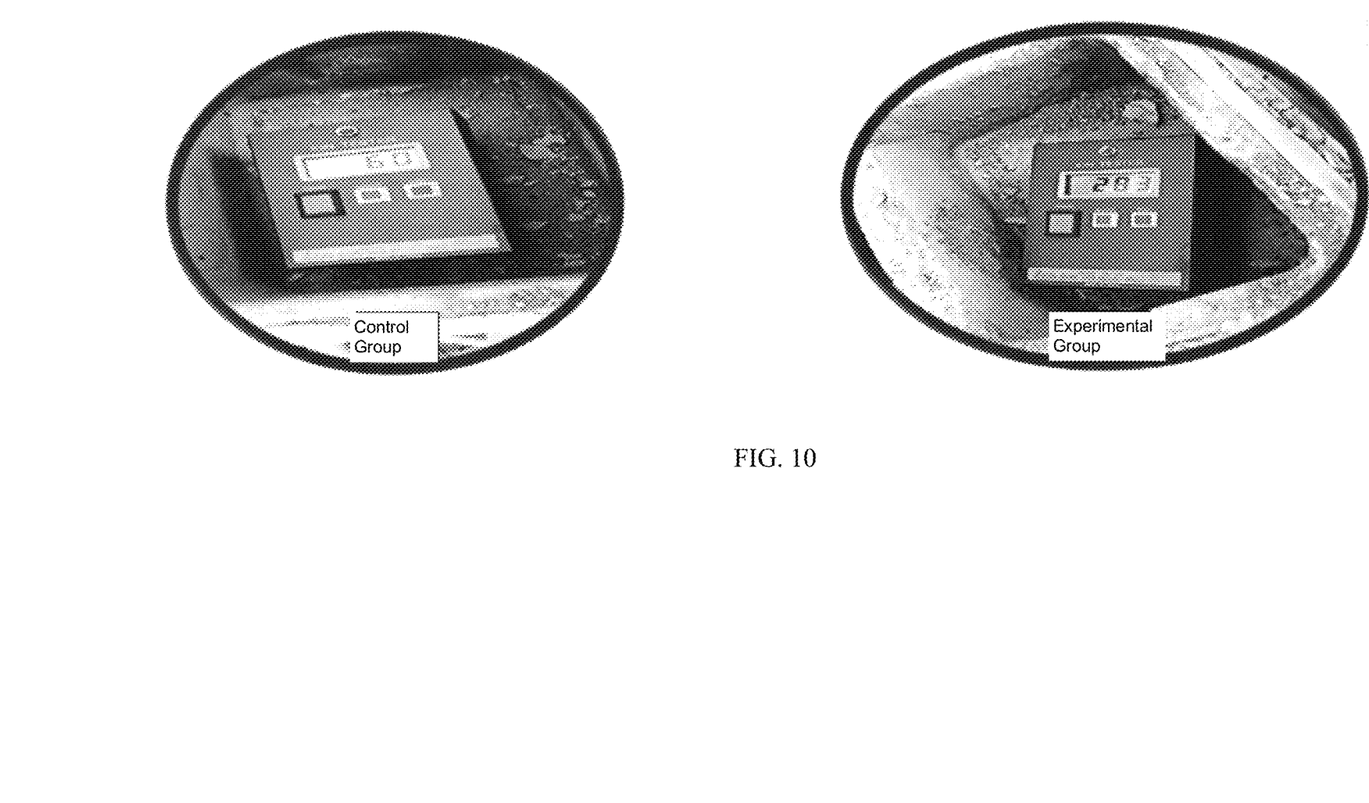
FIG. 10 is a view showing results of confirming a level of anions by using a cement including the cement additive of the present invention as well as a conventional cement.

Referring to FIG. 10, it was confirmed that an anion level of the experimental group is 280-285 ions/cc with an average level of 283 ions/cc, and an anion level of the control group is 60 ions/cc.

In particular, a level of the anions generated in the forests is 280-300 ions/cc, which is similar to that of the experimental group, suggesting that the experimental group achieves an effect similar to staying in the forests.

Further, it can be understood that the anions of the experimental group are about five times more compared to the control group.

Experimental Example 7

An experiment was performed to compare hexavalent chromium after heating by using cements including the cement additives prepared based on Examples 1 to 5 of the present invention.

The experimental group used the cement additive of Example 1.

The control group 1 used the cement additives of Examples 2 and 3, while the control group 2 used the cement additives of Examples 4 and 5.

The cements used above included the cements made by the same manufacturer.

First of all, each cement was added to each beaker including distilled water to confirm that hexavalent chromium is detected.

After that, it was confirmed that no hexavalent chrome is detected after adding each cement additive of the experimental group, the control group 1 and the control group 2 into the beaker filled with the cement, respectively.

Finally, each beaker was heated in an oven at 105° C. for three to four minutes, and it was confirmed whether hexavalent chromium is detected or not.

Figure 11:
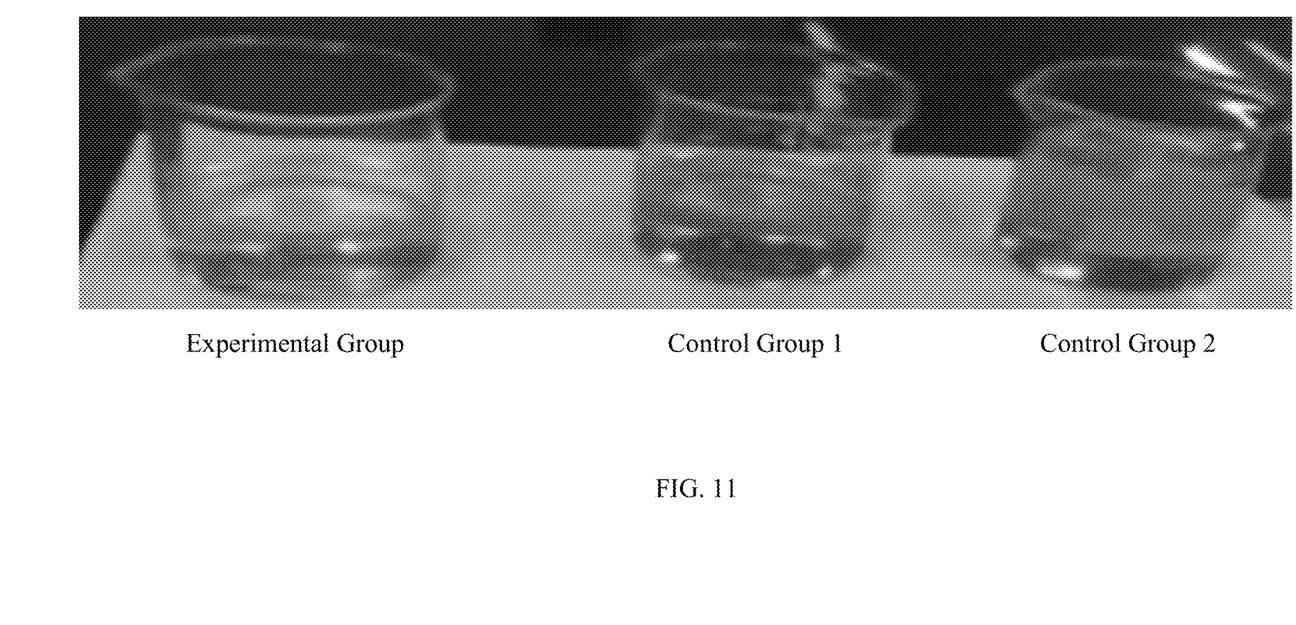
FIG. 11 is a view showing a result of visually confirming the detection of hexavalent chromium according to heating by using a cement including the cement additive of the present invention as well as a conventional cement.

Referring to FIG. 11, it was confirmed that hexavalent chromium is not detected from the experimental group. Accordingly, it can be understood that the trivalent chromium reduced by the cement additive has a thermally stable structure.

In particular, the method for preparing a cement includes a calcination method. However, from the above results, it can be inferred that thermally reduced trivalent chromium is not oxidized again, even if the cement additive is included in an entire process of cement production.

It can be visually confirmed that hexavalent chromium is detected by heat from the control groups 1 and 2, suggesting that hexavalent chromium is oxidized by heat.

Experimental Example 8

An experiment was performed to confirm the efficiency of removing hexavalent chromium and heavy metals by preparing the cement additives prepared based on Examples 1 to 5 of the present invention into a cement mixture as shown in Example 6.

A following table 5 shows the results of confirming the efficiency of removing hexavalent chromium and heavy metals (⊚: best, ○: good, Δ: average).

TABLE 5

| Removal efficiency | Hexavalent chromium | Heavy metal |
|---|---|---|
| Example 1 | ⊚ | ⊚ |
| Example 2 | ○ | ○ |
| Example 3 | ○ | ○ |
| Example 4 | ○ | ○ |
| Example 5 | ○ | Δ |

Referring to Table 5, it was shown that the cement additive of Example 1 achieves the best efficiency of removing hexavalent chrome and heavy metals, the cement additives of Examples 2 to 4 achieve the second best efficiency of removing hexavalent chrome and heavy metals, and the cement additive of Example 5 achieves the third best efficiency of removing heavy metals.

INDUSTRIAL APPLICABILITY

The present invention is industrially applicable and provides a cement additive and a method for preparing the same, in which carcinogens, including heavy metals such as hexavalent chromium and the like, generated from cement are removed while maintaining the strength and intrinsic physical properties of cement.

The invention claimed is:

1. A cement additive comprising:
   13 to 23 parts by weight of charcoal;
   16 to 26 parts by weight of silicate;
   16 to 23 parts by weight of ferrous sulfate heptahydrate; and
   49 to 59 parts by weight of ferrous chloride tetrahydrate.

2. The cement additive of claim 1, further comprising at least one of diatomite; ferric chloride; ferric chloride hexahydrate; tin sulfide; antimony; iron chloride; or iron sulfate.

3. A cement mixture comprising: a cement; and 0.1 to 0.8 wt % of the cement additive of claim 1 added to the cement.

4. The cement mixture of claim 3, further comprising 10 wt % or less of calcium stearate.

5. A cement mixture comprising: a cement; and 0.1 to 0.8 wt % of the cement additive of claim 2 added to the cement.

6. The cement mixture of claim 5, further comprising 10 wt % or less of calcium stearate.

7. A cement additive comprising:
   3 to 23 parts by weight of diatomite;
   16 to 26 parts by weight of silicate;
   16 to 23 parts by weight of ferrous sulfate heptahydrate; and
   49 to 59 parts by weight of ferrous chloride tetrahydrate.

8. A cement mixture comprising: a cement; and 0.1 to 0.8 wt % of the cement additive of claim 7 added to the cement.

9. The cement mixture of claim 8, further comprising 10 wt % or less of calcium stearate.

10. A cement additive comprising:
    13 to 23 parts by weight of charcoal;
    16 to 26 parts by weight of tin sulfide;
    16 to 23 parts by weight of ferrous sulfate heptahydrate; and
    49 to 59 parts by weight of ferrous chloride tetrahydrate.

11. A cement mixture comprising: a cement; and 0.1 to 0.8 wt % of the cement additive of claim 10 added to the cement.

12. The cement mixture of claim 11, further comprising 10 wt % or less of calcium stearate.

13. A cement additive comprising:
    13 to 23 parts by weight of charcoal;
    16 to 26 parts by weight of silicate;
    16 to 23 parts by weight of antimony; and
    49 to 59 parts by weight of ferrous chloride tetrahydrate.

14. A cement mixture comprising: a cement; and 0.1 to 0.8 wt % of the cement additive of claim 13 added to the cement.

15. The cement mixture of claim 14, further comprising 10 wt % or less of calcium stearate.

16. A cement additive comprising:
    13 to 23 parts by weight of charcoal;
    16 to 26 parts by weight of silicate;
    16 to 23 parts by weight of ferrous sulfate heptahydrate; and
    49 to 59 parts by weight of at least one of ferric chloride, ferric chloride hexahydrate, iron chloride or iron sulfate.

17. A cement mixture comprising: a cement; and 0.1 to 0.8 wt % of the cement additive of claim 16 added to the cement.

18. The cement mixture of claim 17, further comprising 10 wt % or less of calcium stearate.

* * * * *